United States Patent
Roussel, Jr. et al.

(10) Patent No.: US 12,487,200 B2
(45) Date of Patent: Dec. 2, 2025

(54) MICROFABRICATED DIFFERENTIAL SCANNING CALORIMETRY SYSTEM AND METHODS OF USE THEREOF

(71) Applicant: University of Louisville Research Foundation, Inc., Louisville, KY (US)

(72) Inventors: Thomas J. Roussel, Jr., Louisville, KY (US); Nichola C. Garbett, Louisville, KY (US); Alexa M. Melvin, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 598 days.

(21) Appl. No.: 17/771,487

(22) PCT Filed: Oct. 26, 2020

(86) PCT No.: PCT/US2020/057412
§ 371 (c)(1),
(2) Date: Apr. 24, 2022

(87) PCT Pub. No.: WO2021/081524
PCT Pub. Date: Apr. 29, 2021

(65) Prior Publication Data
US 2022/0365014 A1  Nov. 17, 2022

Related U.S. Application Data

(60) Provisional application No. 62/925,742, filed on Oct. 24, 2019.

(51) Int. Cl.
*G01N 25/48* (2006.01)
*G01K 17/00* (2006.01)

(52) U.S. Cl.
CPC ....... *G01N 25/4866* (2013.01); *G01K 17/006* (2013.01); *G01N 25/4813* (2013.01)

(58) Field of Classification Search
CPC .......... G01N 25/4866; G01N 25/4813; G01N 25/20; G01N 33/49; G01N 25/48; G01K 17/006; G01K 17/00
See application file for complete search history.

(56) References Cited

U.S. PATENT DOCUMENTS

| 4,001,583 A | 1/1977 | Barrett |
| 4,952,904 A | 8/1990 | Johnson et al. |

(Continued)

FOREIGN PATENT DOCUMENTS

| EP | 3346262 | 7/2018 |
| WO | 2008/089072 | 7/2008 |

(Continued)

OTHER PUBLICATIONS

Schneider, G. et al., "The utility of differential scanning calorimetry curves of blood plasma for diagnosis, subtype differentiation and predicted survival in lung cancer", Cancers, vol. 13, No. 5326, pp. 1-23, (2021).

(Continued)

*Primary Examiner* — Laura Martin
*Assistant Examiner* — Julia Fitzpatrick
(74) *Attorney, Agent, or Firm* — EVAN LAW GROUP LLC

(57) ABSTRACT

A differential scanning calorimetry sensor, comprises a substrate; a heater trace comprising a conductive material, on the substrate; an encapsulation layer, on the substrate and on the heater trace; and a sample heating area, which is on the heater trace. The heater trace has a thickness of 50 to 1000 nm, a width of 1 to 100 pm, and a path length of 5 to 500 mm. Also described are a sample holder, a sensor enclosure and a thermal analysis sensor system.

18 Claims, 7 Drawing Sheets

(56) References Cited

U.S. PATENT DOCUMENTS

| | | | |
|---|---|---|---|
| 5,225,766 | A | 7/1993 | O'Neill |
| 5,763,433 | A | 6/1998 | Morfin |
| 6,399,714 | B1 | 6/2002 | Huang |
| 7,141,210 | B2 | 11/2006 | Bell et al. |
| 7,147,763 | B2 | 12/2006 | Elrod et al. |
| 8,066,429 | B2 | 11/2011 | Danley |
| 8,393,785 | B2 | 3/2013 | De Bruyker et al. |
| 8,685,216 | B2 | 4/2014 | De Bruyker et al. |
| 11,835,529 | B1 | 12/2023 | Garbett et al. |
| 2007/0242722 | A1* | 10/2007 | Nakamura ............. G01N 25/20 374/16 |
| 2008/0172184 | A1 | 7/2008 | Chaires et al. |
| 2010/0093100 | A1 | 4/2010 | Chaires et al. |
| 2011/0216804 | A1 | 9/2011 | Roukes et al. |
| 2011/0301860 | A1 | 12/2011 | Chaires et al. |
| 2012/0220047 | A1 | 8/2012 | Seifried |
| 2014/0339161 | A1 | 11/2014 | Leonard |
| 2016/0245794 | A1 | 8/2016 | Hawtin |
| 2017/0191982 | A1 | 7/2017 | Shatova |
| 2017/0354361 | A1 | 12/2017 | Tan |
| 2018/0001231 | A1 | 1/2018 | Puleo |
| 2018/0277250 | A1 | 9/2018 | Garbett et al. |
| 2019/0064009 | A1* | 2/2019 | Russell ................ G01N 25/486 |
| 2020/0070167 | A1 | 3/2020 | Raillon |
| 2020/0278357 | A1 | 9/2020 | Beshiri et al. |
| 2022/0365014 | A1 | 11/2022 | Roussel, Jr. et al. |
| 2024/0210422 | A1 | 6/2024 | Garbett et al. |

FOREIGN PATENT DOCUMENTS

| | | |
|---|---|---|
| WO | 2010/033606 | 3/2010 |
| WO | 2011/156658 | 12/2011 |
| WO | 2012/109383 | 8/2012 |
| WO | 2017/066800 | 4/2017 |
| WO | 2017/097854 | 6/2017 |
| WO | 2021/081524 | 4/2021 |
| WO | PCT/US2020/057412 | 4/2021 |

OTHER PUBLICATIONS

31 Pages, Aug. 31, 2022, U.S. Appl. No. 15/764,458.
3 Pages, Nov. 16, 2022, U.S. Appl. No. 15/764,458.
3 Pages, Dec. 15, 2022, U.S. Appl. No. 15/764,458.
2 Pages, Jan. 10, 2023, U.S. Appl. No. 15/764,458.
30 Pages, Jan. 23, 2023, U.S. Appl. No. 17/080,533.
4 Pages, May 15, 2023, U.S. Appl. No. 15/764,458.
3 Pages, May 22, 2023, U.S. Appl. No. 17/080,533.
4 Pages, Jun. 27, 2023, U.S. Appl. No. 15/764,458.
10 Pages, Jul. 24, 2023, U.S. Appl. No. 17/080,533.
4 Pages, Sep. 14, 2023, U.S. Appl. No. 17/080,533.
Cooper, A. et al., "Differential scanning microcalorimetry", Protein-Ligand Interactions: hydrodynamics and calorimetry: a practical approach, Oxford University Press, chapter 11, pp. 287-318, (2001).
Johnson, C.M. "Differential scanning calorimetry as a tool for protein folding and stability", Archives of Biochemistry and Biophysics, vol. 531, pp. 100-109, (2013).
Garbett, N.C. et al., "Clinical application of plasma thermograms. Utility, practical approaches and considerations", Methods, vol. 76, pp. 41-50, (2015).
Garbett, N.C. et al., "Differential scanning calorimetry of blood plasma for clinical diagnosis and monitoring", Experimental and Molecular Patholgy, vol. 86, pp. 186-191, (2009).
Garbett, N.C. et al., "Calorimetry outside the box: a new window into the plasma proteome", Biophysical Journal, vol. 94, pp. 1377-1383, (2008).
Garbett, N.C. et al., "Calorimetric analysis of the plasma proteome", Seminars in Nephrology, vol. 27, issue 6, pp. 621-626, (2007).
Garbett, N.C. et al., "Interrogation of the plasma proteome with differential scanning calorimetry", Clinical Chemistry, vol. 53, issue 11, pp. 2012-2014, (2007).
Garbett, N.C., et al., "Ligand binding alters the calorimetric thermogram of albumin", Journal of Clinical Ligand Assay, vol. 29, pp. 194-197, (2006).
Garbett, N.C. et al., "Calorimetric analysis of the plasma proteome: Identification of type 1 diabetes patients with early renal function decline", Biochimica et Biophysica Acta (BBA)—General Subjects, vol. 1830, issue 10, pp. 4675-4680, (2013).
Garbett, N.C. et al., "Detection of cervical cancer biomarker patterns in blood plasma and urine by differential scanning calorimetry and mass spectrometry", Plos One, vol. 9, issue 1, e84710, (2014).
Chagovetz, A.A. et al., "Preliminary use of differential scanning calorimetry of cerebrospinal fluid for the diagnosis of glioblastoma multiforme", Journal of Neuro-Oncology, vol. 105, pp. 499-506, (2011).
Chagovetz, A.A. et al., "Differential scanning calorimetry of gliomas: a new tool in brain cancer diagnostics?", Neurosurgery, vol. 73, pp. 289-295, (2013).
Fekecs, T. et al., "Differential scanning calorimetry (DSC) analysis of human plasma in melanoma patients with or without regional lymph node metastases", Journal of Thermal Analysis and Calorimetry, vol. 108, pp. 149-152, (2012).
Ferencz, A. et al., "Differential scanning calorimetry, as a new method to monitor human plasma in melanoma patients with regional lymph node or distal metastases", Skin Cancer Overview, Dr. Yaguang Xi (Ed.), pp. 141-152, (2011).
Fish, D.J. et al., "Statistical analysis of plasma thermograms measured by differential scanning calorimetry", Biophysical Chemistry, vol. 152, pp. 184-190, (2010).
Krumova, S. et al., "Calorimetric monitoring of the serum proteome in schizophrenia patients", Thermochimica Acta, vol. 572, pp. 59-64, (2013).
Mehdi, M. et al., "Differential scanning calorimetry (DSC) analysis of human plasma in different psoriasis stages", Journal of Thermal Analysis and Calorimetry, vol. 111, pp. 1801-1804, (2013).
Michnik, A. "Blood plasma, serum and serum proteins microcalorimetric studies aimed at diagnosis support", Thermal Analysis in Medical Application, pp. 171-190, (2011).
Michnik, A. et al., "Differential scanning calorimetry study of blood serum in chronic obstructive pulmonary disease", Journal of Thermal Analysis & Calorimetry, vol. 102, pp. 57-60, (2010).
Michnik, A. et al., "DSC serum profiles of sportsmen", Journal of Thermal Analysis & Calorimetry, vol. 113, pp. 365-370, (2013).
Moezzi, M. et al., "Evaluation of blood plasma changes by differential scanning calorimetry in psoriatic patients treated with drugs", Journal of Thermal Analysis & Calorimetry, vol. 116, pp. 557-562, (2014).
Rai, S.N. et al., "Group classification based on high-dimensional data: application to differential scanning calorimetry plasma thermogram analysis of cervical cancer and control samples", Open Access Medical Statistics, vol. 3, pp. 1-9, (2013).
Todinova, S. et al., "Microcalorimetry of blood serum proteome: a modified interaction network in the multiple myeloma case", Analytical Chemistry, vol. 83, pp. 7992-7998, (2011).
Todinova, S. et al., "Calorimetry-based profiling of blood plasma from colorectal cancer patients", Biochimica et Biophysica Acta, vol. 1820, pp. 1879-1885, (2012).
Wisniewski, M.A. et al., "Differential scanning calorimetry in molecular diagnostics", In Vitro Diagnostic Technology, vol. 17, pp. 29-34, (2011).
Zapf, I. et al., "DSC analysis of human plasma in breast cancer patients", Thermochimica Acta, vol. 524, pp. 88-91, (2011).
Vega, S. et al., "Deconvolution analysis for classifying gastric adenocarcinoma patients based on differential scanning calorimetry serum thermograms", Scientific Reports, vol. 5, article No. 7988, pp. 1-8, (2015).
Kikalishvili, L. et al., "Thermal stability of blood plasma proteins of breast cancer patients, DSC study", Journal of Thermal Analysis & Calorimetry, vol. 120, pp. 501-505, (2015).
Zapf, I. et al., "Influence of oxidative injury and monitoring of blood plasma by DSC on breast cancer patients", Journal of Thermal Analysis & Calorimetry, vol. 123, pp. 2029-2035, (2016).

(56) References Cited

OTHER PUBLICATIONS

Krumova, S. et al., "Calorimetric features of IgM gammopathies. Implication for patient's diagnosis and monitoring", Thermochimica Acta, vol. 615, pp. 23-29, (2015).
Barceló, F. et al., "Characterization of monoclonal gammopathy of undetermined significance by calorimetric analysis of blood serum proteome", Plos One, vol. 10, No. 3, e0120316, pp. 1-15, (2015).
Moezzi, M. et al., "Influence of oxidative injury and monitoring of blood plasma by DSC on patients with psoriasis", Journal of Thermal Analysis & Calorimetry, vol. 123, pp. 2037-2043, (2015).
Szalai, Z. et al., "Differential scanning calorimetry (DSC) of blood serum in chronic obstructive pulmonary disease (COPD)", Journal of Thermal Analysis & Calorimetry, vol. 113, pp. 259-264, (2013).
Rasmussen, A. et al., "The lupus family registry and repository", Rheumatology, vol. 50, pp. 47-59, (2011).
Hochberg, M.C., "Updating the american college of rheumatology revised criteria for the classification of systemic lupus erythematosus", Arthritis & Rheumatism, vol. 40, No. 9, p. 1725, (1997).
Ulbricht, J. "Package "lqa" Penalized likelihood inference for GLMs", R package version, pp. 1-42, (2012).
Friedman, J. et al., "Regularization paths for generalized linear models via coordinate descent", Journal of Statistical Software, vol. 33, No. 1, pp. 1-22, (2010).
Becker, N. et al., "penalizedSVM: a R-package for feature selection SVM classification", Bioinformatics, vol. 25, No. 13, pp. 1711-1712, (2009).
Becker, N. et al., "Elastic SCAD as a novel penalization method for SVM classification tasks in high-dimensional data", BMC Bioinformatics, vol. 12, No. 138, pp. 1-13, (2011).
Xu, P. et al., "Modified linear discriminant analysis approaches for classification of high-dimensional microarray data", Computational Statistics & Data Analysis, vol. 53, pp. 1674-1687, (2009).
Witten, D.M. et al., "Penalized classification using Fisher's linear discriminant", Journal of the Royal Statistical Society, Series B, vol. 73, No. 5, pp. 753-772, (2011).
Gaynanova, I. et al., "Simultaneous sparse estimation of canonical vectors in the p >> N setting", Journal of the American Statistical Association, vol. 111, No. 514, pp. 696-706, (2015).
Witten, D. "Package penalizedLDA: Penalized classification using Fisher's linear discriminant", Journal of the Royal Statistical Society, Series B, vol. 73, No. 5, pp. 753-772, (2011).
Gaynanova, I., "MGSDA: Multi-group sparse discriminant analysis", R package version 1.1, pp. 1-8, (2014).
Gromski, P. S. et al., "A tutorial review: Metabolomics and partial least squares-discriminant analysis—a marriage of convenience or a shotgun wedding", Analytica Chimica Acta, vol. 879, pp. 10-23, (2015).
Chun, H. et al., "Sparse partial least squares regression for simultaneous dimension reduction and variable selection", Journal of the Royal Statistical Society, Series B, vol. 72, No. 1, pp. 3-25, (2010).
Chung, D. et al., "Sparse partial least squares classification for high dimensional data", Statistical Applications in Genetics and Molecular Biology, vol. 9, issue 1, article 17, pp. 1-32, (2010).
Kuhn, M., "Building predictive models in R using the caret package", Journal of Statistical Software, vol. 28, issue 5, pp. 1-26, (2008).
Rivero, S.J. et al., "Lymphopenia in systemic lupus erythematosus, clinical, diagnostic, and prognostic significance", Arthritis and Rheumatism, vol. 21, No. 3, pp. 295-305, (1978).
The Autoimmune Diseases Coordinating Committee, "Progress in autoimmune diseases research", National Institutes of Health, U.S. Department of Health and Human Services, (2005).
Illei, G.G. et al., "Biomarkers in systemic lupus erythematosus, II. Markers of disease activity", Arthritis and Rheumatism, vol. 50, No. 7, pp. 2048-2065, (2004).
Ahearn, J.M. et al., "Biomarkers for systemic lupus erythematosus", Translational Research, vol. 159, issue 4, pp. 326-342, (2012).
Liu, C-C. et al., "Cell-bound complement biomarkers for SLE: From benchtop to bedside", Rheumatic Disease Clinics North America, vol. 36, issue 1, pp. 161-172, (2010).
Kalunian, K.C. et al., "Measurement of cell-bound complement activation products enhances diagnostic performance in systemic lupus erythematosus", Arthritis & Rheumatism, vol. 64, No. 12, pp. 4040-4047, (2012).
Benjamini, Y. et al., "Controlling the false discovery rate: a practical and powerful approach to multiple testing", Journal of the Royal Statistical Society, vol. 57, No. 1, pp. 289-300, (1995).
Garbett, N.C. et al., "Differential scanning calorimetry as a complementary diagnostic tool for the evaluation of biological samples", Biochimica et Biophysica Acta (BBA)—General Subjects, vol. 1860, issue 5, pp. 981-989, (2016).
Romero-Diaz, J. et al., "Measures of adult systemic lupus erythematosus: updated version of British Isles Lupus Assessment Group (BILAG 2004), European Consensus Lupus Activity Measurements (ECLAM), Systemic Lupus Activity Measure, Revised (SLAM-R), Systemic Lupus Activity Questionnaire for Population Studies (SLAQ), Systemic Lupus Erythematosus Disease Activity Index 2000 (SLEDAI-2K), and Systemic Lupus International Collaborating Clinics/American College of Rheumatology Damage Index (SDI)", Arthritis Care and Research, vol. 63, issue s11, pp. s37-s46, (2011).
Petri, M. et al., "Derivation and validation of the Systemic Lupus International Collaborating Clinics classification criteria for systemic lupus erythematosus", Arthritis and rheumatism, vol. 64, No. 8, pp. 2677-2686, (2012).
Anić, F. et al., "New classification criteria for systemic lupus erythematosus correlate with disease activity", Croatian Medical Journal, vol. 55, pp. 514-519, (2014).
International Search Report and Written Opinion dated Jan. 17, 2017 for PCT application No. PCT/US2016/057416, 11 pages.
"IUPAC-IUB commission on biochemical nomenclature symbols for amino-acid derivatives and peptides recommendations", Biochemistry, vol. 11, No. 9, pp. 1726-1732, (1972).
Heinlen, L.D. et al., "Clinical criteria for systemic lupus erythematosus precede diagnosis, and associated autoantibodies are present before clinical symptoms", Arthritis & Rheumatism, vol. 56, No. 7, pp. 2344-2351, (2007).
International Search Report and Written Opinion dated Apr. 7, 2021 for PCT application No. PCT/US2020/057412, 18 pages.
Rai, S.N. et al., "Multi-group diagnostic classification of high-dimensional data using differential scanning calorimetry plasma thermograms", Plos One, vol. 14, No. 8, pp. 1-17, (2019).
Melvin, A. et al., "Development of a power-compensated MEMS DSC sensor", (Abstract).
Melvin, A. et al., "Development of a power-compensated MEMS DSC sensor", (Poster).
Tsvetkov, P.O. et al., "An AI-powered blood test to detect cancer using nanoDSF", Cancers, vol. 13, pp. 1-9, (2021).
DeFilippis, A.P. et al., "Assessment and treatment of patients with type 2 myocardial infarction and acute nonischemic myocardial injury", Circulation, vol. 140, pp. 1661-1678, (2019).
DeFilippis, A.P. et al., "Identification of a plasma metabolomic signature of thrombotic myocardial infarction that is distinct from non-thrombotic myocardial infarction and stable coronary artery disease", PLOS One, vol. 12, issue 4, pp. 1-23, (2017).
Go, A.S. et al., "Heart disease and stroke statistics 2014 update: A report from the American heart association", Circulation, vol. 129, No. 3, pp. 1-267, (2014).
Pitts, S.R. et al., "National hospital ambulatory medical care survey: 2006 emergency department summary", National health statistics reports, No. 7, pp. 1-39, (2008).
Newby, L.K. et al., "Accf 2012 expert consensus document on practical clinical considerations in the interpretation of troponin elevations: a report of the American college of cardiology foundation taskforce on clinical expert consensus documents", Journal of the American College of Cardiology, vol. 60, No. 23, pp. 2427-2463, (2012).
Bax, J.J. et al., "Third universal definition of myocardial infarction", Journal of the American College of Cardiology, vol. 60, No. 16, pp. 1581-1598, (2012).

(56) References Cited

OTHER PUBLICATIONS

Gore, M.O. et al., "Age-and sex-dependent upper reference limits for the high-sensitivity cardiac troponin t assay", Journal of the American College of Cardiology, vol. 63, No. 14, pp. 1441-1448, (2014).

Javed, U. et al., "Frequency of elevated troponin I and diagnosis of acute myocardial infarction", The American Journal of Cardiology, vol. 104, No. 1, pp. 9-13, (2009).

Wong, P. et al., "Raised cardiac troponin t levels in patients without acute coronary syndrome", Postgraduate Medical Journal, vol. 83, No. 977, pp. 200-205, (2007).

Wong, P. et al., "Effects of comorbidity and hospital care on 6-month mortality inpatients with elevated cardiac troponin t", Postgraduate Medical Journal, vol. 83, No. 979, pp. 332-337, (2007).

Wong, P.S.C. et al., "Early and late mortality in hospitalized patients with raised cardiac troponin t", Postgraduate Medical Journal, vol. 88, No. 1042, pp. 437-442, (2012).

Reeder, G.S. et al., "Overview of the acute management of ST-elevation myocardial infarction", Up to Date, pp. 1-14, found at www.uptodate.com/contents/overview-of-the-acute-management-of-st-elevation-myocardial-infarction?search=Overview of the acute management of ST-elevation myocardial infarction&source=search_result&selectedTitle=1~150&usage_type=default&display_rank=1, (2019).

Reeder, G.S. et al., "Overview of the non-acute management of ST elevation myocardial infarction", Up to Date, pp. 1-12, found at www.uptodate.com/contents/overview-of-the-non-acute-management-of-st-elevation-myocardial-infarction?search=Overview of the non-acute management of ST elevation myocardial infarction&source=search_result&selectedTitle=1~150&usage_type=default&display_rank=1, (2019).

Benjamin, E.J. et al., "Heart Disease and Stroke Statistics-2018 Update: A Report from the American Heart Association", Circulation, vol. 137, pp. e67-e492, (2018).

Thygesen, K. et al., "Fourth Universal Definition of Myocardial Infarction", Circulation, vol. 138, pp. e618-e651, (2018).

Amsterdam, E.A. et al., "2014 AHA/ACC guideline for the management of patients with non-ST-elevation acute coronary syndromes: executive summary: a report of the American College of Cardiology/American Heart Association Task Force on Practice Guidelines", Circulation, vol. 130, pp. 2354-2394, (2014).

Collet, J.P. et al., "2020 ESC Guidelines for the management of acute coronary syndromes in patients presenting without persistent ST-segment elevation", European Heart Journal, vol. 42, pp. 1289-1367, (2021).

Tamis-Holland, J.E. et al., "Contemporary Diagnosis and Management of Patients With Myocardial Infarction in the Absence of Obstructive Coronary Artery Disease: A Scientific Statement From the American Heart Association", Circulation, vol. 139, e891-e908, (2019).

Sarkisian, L. et al., "Prognostic Impact of Myocardial Injury Related to Various Cardiac and Noncardiac Conditions", The American Journal of Medicine, vol. 129, pp. 506-514, (2016).

Pope, J.H. et al., "Missed diagnoses of acute cardiac ischemia in the emergency department", The New England Journal of Medicine, vol. 342, pp. 1163-1170, (2000).

Tatum, J.L. et al., "Comprehensive strategy for the evaluation and triage of the chest pain patient", Annals of Emergency Medicine, vol. 29, pp. 116-125, (1997).

Jneid, H. et al., "2017 AHA/ACC Clinical Performance and Quality Measures for Adults With ST-Elevation and Non-ST-Elevation Myocardial Infarction: A Report of the American College of Cardiology/American Heart Association Task Force on Performance Measures", Journal of the American College of Cardiology, vol. 70, pp. 2048-2090, (2017).

Bueno, H. et al., "Effect of thrombolytic therapy on the risk of cardiac rupture and mortality in older patients with first acute myocardial infarction", European Heart Journal, vol. 26, pp. 1705-1711, (2005).

Wallentin, L. et al., "Efficacy and safety of tenecteplase in combination with the low-molecular-weight heparin enoxaparin or unfractionated heparin in the prehospital setting: the Assessment of the Safety and Efficacy of a New Thrombolytic Regimen (ASSENT)-3 Plus randomized trial in acute myocardial infarction", Circulation, vol. 108, pp. 135-142, (2003).

Mehta, L.S., "Acute Myocardial Infarction in Women A Scientific Statement from the American Heart Association", Circulation, vol. 133, pp. 916-947, (2016).

Culic, V. et al., "Symptom presentation of acute myocardial infarction: Influence of sex, age, and risk factors", American Heart Journal, vol. 144, No. 6, pp. 1012-1017, (2002).

DeFilippis, A.P. et al., "Myocardial Infarction as a Clinical End Point in Research, What are we really talking about?", Circulation Research, vol. 124, No. 12, pp. 1701-1703, (2019).

Trainor, P.J. et al., "Systems characterization of differential plasma metabolome perturbations following thrombotic and non-thrombotic myocardial infarction", Journal of Proteomics, vol. 160, pp. 38-46, (2017).

Trainor, P.J. et al., "Wisdom of artificial crowds feature selection in untargeted metabolomics: An application to the development of a blood-based diagnostic test for thrombotic myocardial infarction", Journal of Biomedical Informatics, vol. 81, pp. 53-60, (2018).

Trainor, P.J. et al., "Evaluation of classifier performance for multiclass phenotype discrimination in untargeted metabolomics", Metabolites, vol. 7, No. 30, pp. 1-20, (2017).

Garbett, N.C. et al., "Characterization and classification of lupus patients based on plasma thermograms", PloS One, vol. 12, No. 11, pp. 1-11, (2017).

Kendrick, S.K. et al., "Application and interpretation of functional data analysis techniques to differential scanning calorimetry data from lupus patients", PloS one, vol. 12, No. 11, pp. 1-21, (2017).

Velazquez-Campoy, A. et al., "Thermal liquid biopsy for monitoring melanoma patients under surveillance during treatment: A pilot study", Biochimica et Biophysica acta General subjects, vol. 1862, issue 8, pp. 1701-1710, (2018).

Krumova, S. et al., "Intercriteria analysis of calorimetric data of blood serum proteome", Biochimica et Biophysica acta General subjects, vol. 1861, issue 2, pp. 409-417, (2017).

Todinova, S. et al., "Calorimetric markers for monitoring of multiple myeloma and waldenstrom's macroglobulinemia patients", European Biophysics Journal, vol. 47, pp. 549-559, (2018).

Todinova, S. et al., "Calorimetric markers of Bence Jones and nonsecretory multiple myeloma serum proteome", Analytical Chemistry, vol. 86, pp. 12355-12361, (2014).

Levine, G.N. et al., "2015 ACC/AHA/SCAI Focused Update on Primary Percutaneous Coronary Intervention for Patients With ST-Elevation Myocardial Infarction: An Update of the 2011 ACCF/AHA/SCAI Guideline for Percutaneous Coronary Intervention and the 2013 ACCF/AHA Guideline for the Management of ST-Elevation Myocardial Infarction", Circulation, vol. 133, No. 11, pp. 1135-1147 (2016).

Amsterdam, E. A., et al., "2014 AHA/ACC Guideline for the Management of Patients With Non-ST-Elevation Acute Coronary Syndromes", Circulation, vol. 130, No. 25, pp. e344-e426, (2014).

O'Gara, P.T., et al. "2013 ACCF/AHA Guideline for the Management of ST-Elevation Myocardial Infarction" Circulation, vol. 127, pp. 529-555, (2013).

Kramer, M.C. et al., "Relationship of thrombus healing to underlying plaque morphology in sudden coronary death", Journal of the American College of Cardiology, vol. 55, pp. 122-132, (2010).

Kramer, M.C. et al., "Presence of older thrombus is an independent predictor of long-term mortality in patients with ST-elevation myocardial infarction treated with thrombus aspiration during primary percutaneous coronary intervention", Circulation, vol. 118, pp. 1810-1816, (2008).

Thygesen, K. et al., "Third Universal Definition of Myocardial Infarction", Circulation, vol. 126, pp. 2020-2035, (2012).

Wagner, G.S. et al., "AHA/ACCF/HRS recommendations for the standardization and interpretation of the electrocardiogram: part VI: acute ischemia/infarction: a scientific statement from the American Heart Association Electrocardiogramand Arrhythmias Committee, Council on Clinical Cardiology; the American College of Cardiol-

(56) References Cited

OTHER PUBLICATIONS ogy Foundation; and the Heart Rhythm Society. Endorsed by the International Society for Computerized Electrocardiology", Journal of the American College of Cardiology, vol. 53, pp. 1003-1011, (2009).
Ambrose, J.A. et al., "Angiographic evolution of intracoronary thrombus and dissection following percutaneous transluminal coronary angioplasty (the Thrombolysis and Angioplasty in Unstable Angina [TAUSA] trial)", The American Journal of Cardiology, vol. 79, pp. 559-563, (1997).
Ambrose, J.A. et al., "Adjunctive thrombolytic therapy during angioplasty for ischemic rest angina. Results of the TAUSA trial", Circulation, vol. 90, pp. 69-77, (1994).
Ambrose, J.A. et al., "Angiography in unstable angina", The American Journal of Cardiology, vol. 68, pp. 78B-84B, (1991).
Capone, G. et al., "Frequency of intracoronary filling defects by angiography in angina pectoris at rest", The American Journal of Cardiology, vol. 56, pp. 403-406, (1985).
Dangas, G. et al., "Correlation of angiographic morphology and clinical presentation in unstable angina", Journal of the American College of Cardiology, vol. 29, pp. 519-525, (1997).
Gibson, C.M. et al., "Relationship of the TIMI myocardial perfusion grades, flow grades, frame count, and percutaneous coronary intervention to long-term outcomes after thrombolytic administration in acute myocardial infarction", Circulation, vol. 105, pp. 1909-1913, (2002).
Gibson, C.M. et al., "Relationship of TIMI myocardial perfusion grade to mortality after administration of thrombolytic drugs", Circulation, vol. 101, pp. 125-130, (2000).
Goldstein, J.A. et al., "Multiple complex coronary plaques in patients with acute myocardial infarction", The New England Journal of Medicine, vol. 343, pp. 915-922, (2000).
Zack, P.M. et al., "The occurrence of angiographically detected intracoronary thrombus in patients with unstable angina pectoris", American Heart Journal, vol. 108, pp. 1408-1412, (1984).
Kedra-Krolik, K. et al., "Blood serum calorimetry indicates the chemotherapeutic efficacy in lung cancer treatment", Scientific Reports, vol. 7, issue 1, art No. 16796, pp. 1-5, (2017).
Liaw, A. et al., "Classification and regression by randomForest", R News, vol. 2/3, pp. 18-22, (2002).
Qi, Y., "Random forest for bioinformatics", Ensemble Machine Learning Methods and Applications, chapter 11, pp. 307-323, (2012).
Denoyer, L. et al., "Deep sequential neural network", EWRL 2015—Workshop Deep Learning NIPS, pp. 1-9, (2014).
Ketkar, N., "Introduction to keras", Deep Learning with Python, pp. 95-109, (2017).
Fernandez-Delgado, M. et al., "Do we need hundreds of classifiers to solve real world classification problems?", Journal of Machine Learning Research, vol. 15, pp. 3133-3181, (2014).
Wang, L. et al., "Demonstration of MEMS-based differential scanning calorimetry for determining thermodynamic properties of biomolecules", Sensors and Actuators B: Chemical, vol. 134, pp. 953-958, (2008).
Yu, S. et al., "Review of MEMS differential scanning calorimetry for biomolecular study", Frontiers of Mechanical Engineering, vol. 12, No. 4, pp. 526-538, (2017).
Jia, Y. et al., "A polymer-based MEMS differential scanning calorimeter", Sensors and Actuators A: Physical, vol. 231, pp. 1-7, (2015).
Wang, B. et al., "MEMS-based AC differential scanning calorimetry", 2011 16th International Solid-State Sensors, Actuators and Microsystems Conference, pp. 1958-1961, (2011).
Wang, B. et al., "A MEMS differential scanning calorimeter for thermodynamic characterization of biomolecules", 2011 IEEE 24th International Conference on Micro Electro Mechanical Systems, pp. 821-824, (2011).
Wang, B. et al., "A MEMS differential-scanning-calorimetric sensor for thermodynamic characterization of biomolecules", Journal of Microelectromechanical Systems, vol. 21, No. 5, pp. 1165-1171, (2012).
Wang, L. et al., "A MEMS thermal biosensor for metabolic monitoring applications", Journal of Microelectromechanical Systems, vol. 17, No. 2, pp. 318-327, (2008).
Todinova, S. et al., "Blood plasma thermograms dataset analysis by means of intercriteria and correlation analyses for the case of colorectal cancer", International Journal Bioautomation, vol. 20, No. 1, pp. 115-124, (2016).
Michnik, A. et al., "Differences in cryostimulation and sauna effects on post-exercise changes in blood serum of athletes", Complementary Therapies in Medicine, vol. 51, pp. 1-6, (2020).
Lorinczy, D., et al., "Comparison of deconvoluted plasma DSC curves on patients with solid tumors", Journal of Thermal Analysis and Calorimetry, vol. 142, pp. 1243-1248, (2020).
Jaggi, R.D. et al., "Microfluidic depletion of red blood cells from whole blood in high-aspect-ratio microchannels", Microfluid, Nanofluidics, vol. 3, No. 1, pp. 47-53, (2007).
Rodriguez-Villarreal, A.I. et al., "High flow rate microfluidic device from blood plasma separation using a range of temperatures", Lab Chip, vol. 10, No. 2, pp. 211-219, (2010).
Kersaudy-Kerhoas, M. et al., "Validation of a blood plasma separation system by biomarker detection", Lab Chip, vol. 10, No. 12, pp. 1587-1595, (2010).
Tripathi, S. et al., "Blood plasma separation in elevated dimension t-shaped microchannel", Biomedical Microdevices, vol. 15, No. 3, pp. 415-425, (2013).
Lee, M.G. et al., "Inertial blood plasma separation in a contraction-expansion array microchannel", Applied Physics Letters, vol. 98, No. 25, pp. 253702-1-253702-3, (2011).
Blattert, C. et al., "Separation of blood in microchannel bends", The 26$^{th}$ Annual International Conference of the IEEE Engineering in Medicine and Biology Society, vol. 1, pp. 2627-2630, (2004).
Tripathi, S. et al., "Microdevice for plasma separation from whole human blood using bio-physical and geometrical effects", Science Reports, vol. 6, pp. 1-15, (2016).
Prabhakar, A. et al., "A novel, compact and efficient microchannel arrangement with multiple hydrodynamic effects for blood plasma separation", Microfluidics and Nanofluidics, vol. 18, No. 5-6, pp. 995-1006, (2015).
Kersaudy-Kerhoas, M. et al., "Micro-scale blood plasma separation: from acoustophoresis to egg-beaters", Lab on a Chip, vol. 13, No. 17, pp. 3323-3346, (2013).
Tripathi, S. et al., "Passive blood plasma separation at the microscale: A review of design principles and microdevices", Journal of Micromechanics and Microengineering, vol. 25, No. 8, pp. 1-24, (2015).
Yu, Z.T.F. et al., "Microfluidic blood cell preparation: now and beyond", Small, vol. 10, No. 9, pp. 1687-1703, (2014).
Wu, D. et al., "How long can we store blood samples: a systematic review and meta-analysis", EBioMedicine, vol. 24, pp. 277-285, (2017).
Dean, L., "Blood groups and red cell antigens", National Center for Biotechnology Information, pp. 1-86, (2005).
Laser, D. J. et al., "A review of micropumps", Journal of Micromechanics and Microengineering, vol. 14, pp. R35-R64 (2004).
Au, A.K. et al., "Mail-order microfluidics: evaluation of stereolithography for the production of microfluidic devices", Lab on a Chip, vol. 7, pp. 1294-1301, (2014).
Au, A.K. et al., "3D-printed microfluidic automation", Lab on a Chip, vol. 15, No. 8, pp. 1934-1941, (2015).
Lee, Y.S. et al., "3D-printed Quake-style microvalves and micropumps", Lab on a Chip, vol. 18, No. 8, pp. 1207-1214 (2018).
Melvin, A.M. et al., "Modeling 3D printed check valves for microfluidic systems", 2018 IEEE International Symposium on Signal Processing and Information Technology (ISSPIT), pp. 179-184, (2018).
Buscaglia, R. et al., "Segment-wise nonparametric classification of multivariate functional data: Lupus identification using plasma thermograms", Journal of Applied Statistics, pp. 1-47, (2018).
Aguilera, A.M. et al., "Functional analysis of chemometric data", Open Journal of Statistics, vol. 3, pp. 334-343, (2013).

(56) References Cited

OTHER PUBLICATIONS

Wallig, M. et al., "Foreach parallel adaptor for the parallel package", Microsoft Corporation R package version 1, pp. 1-4, (2020).
Berrendero, J.R. et al., "Variable selection in functional data classification: a maxima-hunting proposal", Statistica Sinica, vol. 26, pp. 619-638, (2016).
Caruana, R. et al., "Ensemble selection from libraries of models", Proceedings of the twenty-first international conference on Machine learning, ACM, pp. 1-8, (2004).
Delaigle, A. et al., "Componentwise classification and clustering of functional data", Biometrika, vol. 99, pp. 299-313, (2012).
Dietterich, T.G. et al., "Ensemble methods in machine learning", International Workshop on Multiple Classifier Systems, pp. 1-15, (2000).
Dietterich, T.G., "Ensemble learning", The handbook of brain theory and neural networks, pp. 405-408, (2002).
Dudani, S.A., "The distance-weighted k-nearest-neighbor rule", IEEE Transactions on Systems, Man and Cybernetics, pp. 325-327, (1976).
Febrero-Bande, M. et al., "Statistical computing in functional data analysis: The R package fda.usa", Journal of Statistical Software, vol. 51, pp. 1-28, (2012).
Ferraty, F. et al., "Curves discrimination: a nonparametric functional approach", Computational Statistics & Data Analysis, vol. 44, pp. 161-173, (2003).
Gul, A. et al., "Ensemble of a subset of kNN classifiers", Advances in Data Analysis and Classification, vol. 12, pp. 827-840, (2016).
Hastie, T. et al., "Penalized discriminant analysis", The Annals of Statistics, vol. 23, pp. 73-102, (1995).
Hechenbichler, K. et al., "Weighted k-nearest-neighbor techniques and ordinal classification", Sonderforschungsbereich, vol. 386, paper 399, pp. 1-16, (2004).
Kohavi, R. et al., "Wrappers for feature subset selection", Artificial Intelligence, vol. 97, pp. 273-324, (1997).
Krier, C. et al., "Supervised variable clustering for classification of NIR spectra", Proceedings of the $17^{th}$ European Symposium on Artificial Neural Networks—Advances in Computational Intelligence and Learning (ESANN 2009), pp. 263-268, (2009).
Li, B. et al., "Classification of functional data: A segmentation approach", Computational Statistics & Data Analysis, vol. 52, pp. 4790-4800, (2008).
Muller, K.R. et al., "An introduction to kernel-based learning algorithms", IEEE Transactions on Neural Networks, vol. 12, No. 2, pp. 181-201, (2001).
Parzen, E. "On estimation of a probability density function and mode", The Annals of Mathematical Statistics, vol. 33, issue 3, pp. 1065-1076, (1962).
Porro-Munoz, D. et al., "Dissimilarity representation on functional spectral data for classification", Journal of Chemometrics, vol. 25, No. 9-10, pp. 476-486, (2011).
Ristoski, P. et al., "Feature selection in hierarchical feature spaces", International Conference on Discovery Science, $17^{th}$ International Conference, pp. 288-300, (2014).
Rizwan, M. et al., Comparison of Distance Metrics for Phoneme Classification based on Deep Neural Network Features and Weighted k-NN Classifier, Georgia Institute of Technology, pp. 1-5, (2014).
Rokach, L., "Ensemble-based classifiers", Artificial Intelligence Review, vol. 33, pp. 1-39, (2010).
Tibshirani, R. et al., "Sparsity and smoothness via the fused lasso", Journal of the Royal Statistical Society: Series B (Statistical Methodology), vol. 67, part 1, pp. 91-108, (2005).
Yang, P. et al., "A review of ensemble methods in bioinformatics", Current Bioinformatics, vol. 5, pp. 296-308, (2010).
Cambon, A.C. et al., "Classification of clinical outcomes using high-throughput informatics: Part 1—nonparametric method reviews", Model Assisted Statistics and Applications, vol. 10, pp. 3-23, (2015).
Cambon, A.C. et al., "Classification of clinical outcomes using high-throughput informatics: Part 2—parametric method reviews", Model Assisted Statistics and Applications, vol. 10, pp. 89-107, (2015).
Melvin, A. et al., "Design and simulation of 3D printed check valves using fluid-structure interaction", 1 page, Aug. 2018, (Poster).
Melvin, A. et al., "A 3D printed microfluidic manifold to separate plasma from whole blood", GSC Presentation, 1 Page, Poster, Feb. 28, 2019.
Melvin, A. et al., "A 3D printed microfluidic manifold to separate plasma from whole blood", GSC Presentation, pp. 1-15, Feb. 28, 2019.
Braun, M.M. et al., "Stable coronary artery disease: Treatment", American Family Physician, vol. 97, No. 6, pp. 376-384, (2018).
U.S. Appl. No. 15/764,458, filed Mar. 29, 2018, Oct. 17, 2016.
U.S. Appl. No. 17/080,533, filed Oct. 26, 2020.
U.S. Appl. No. 17/080,805, filed Oct. 26, 2020.
U.S. Appl. No. 18/523,208, filed Nov. 29, 2023.
28 Pages, Mar. 8, 2024, U.S. Appl. No. 15/764,458.
44 Pages, Mar. 22, 2024, U.S. Appl. No. 17/080,805.
30 Pages, Sep. 3, 2024, U.S. Appl. No. 15/764,458.
7 Pages, Sep. 20, 2024, U.S. Appl. No. 17/771,487.
52 Pages, Nov. 5, 2024, U.S. Appl. No. 17/771,487.
21 Pages, Dec. 12, 2024, U.S. Appl. No. 17/080,805.
32 Pages, Feb. 14, 2025, U.S. Appl. No. 18/523,208.
5 Pages, Mar. 21, 2025, U.S. Appl. No. 17/080,805.
3 Pages, Apr. 1, 2025, U.S. Appl. No. 17/771,487.

* cited by examiner

MICROFABRICATED DIFFERENTIAL SCANNING CALORIMETRY SYSTEM AND METHODS OF USE THEREOF

GOVERNMENT RIGHTS

This invention was made with government support under Grant No. U01 HL127518 awarded by the National Institutes of Health and Grant No. U01 HL152392 awarded by the National Institutes of Health. The government has certain rights in the invention.

BACKGROUND

Differential scanning calorimetry (DSC) is a thermo analytical technique that measures the thermal profile (thermogram) of biomolecules. DSC is the method of choice for thermodynamic studies of protein denaturation, where temperature-induced unfolding of proteins can be directly measured without need for derivatization or secondary probes. DSC may be used as an alternate, complementary approach to characterize changes in the overall biomolecular makeup of a sample, including changes in concentrations, structures, modifications, interactions or reactions involving biomolecules and disease markers, for disease detection and monitoring. The novel application of DSC for diagnosing and understanding human disease has generated significant data indicating that observable differences in the thermodynamic properties of human plasma can be used to differentiate clinical samples based on health status. Plasma thermogram data for over 15 different cancers, autoimmune and other diseases have been obtained, which show the potential of DSC thermograms to be used in the characterization of different diseases [1-26]. Examples of thermograms obtained for plasma samples from patients with several different diseases is shown by FIG. 1. See, for example, PCT Pub. Nos. WO 2017/066800, WO 2011/156658, WO 2010/033606 and WO 2008/089072 [27-30]. This approach has been validated by multiple research groups in a variety of disease settings [1-26].

Despite promising results indicating the potential utility of DSC as a clinical tool, development and discovery has been hampered by the need for expensive instrumentation, low experimental throughput, and the specialized training required for data collection and bioinformatics analysis. Thus, the DSC technology at present has been challenging to apply in the clinical setting.

SUMMARY

In a first aspect, the invention is a differential scanning calorimetry sensor, comprising a substrate; a heater trace comprising a conductive material, on the substrate; and an encapsulation layer, on the substrate and on the heater trace. The heater trace has a thickness of 50 to 1000 nm, a width of 1 to 100 μm, and a path length of 5 to 500 mm.

In a second aspect, the invention is a sample holder for differential scanning calorimetry, comprising a sample holder body having an external surface; a sample chamber having a volume of 1 to 500 μL, inside the sample holder body; and an inlet channel and an outlet channel, each fluidly connecting the sample chamber to the external surface of the sample holder body. The sample holder body has an isolation membrane, separating the sample chamber from the external surface, and the isolation membrane has a thickness of at most 500 μm.

In a third aspect, the invention is a sensor enclosure, comprising an enclosure base; a first printed circuit board on the enclosure base; a differential scanning calorimetry sensor, on and electrically connected to the first printed circuit board; optionally a second differential scanning calorimetry sensor on and electrically connected to the first printed circuit board; and an electrical connector electrically connected to the first printed circuit board, passing through the enclosure base.

In a fourth aspect, the invention is a thermal analysis sensor system, comprising (a) a sensor enclosure, comprising (i) an enclosure base, (ii) a first printed circuit board on the enclosure base, (iii) a differential scanning calorimetry sensor, on and electrically connected to the first printed circuit board, and (iv) an electrical connector electrically connected to the first printed circuit board, passing through the enclosure base; and (b) a sample holder, on the differential scanning calorimetry sensor, comprising (A) a sample holder body having an external surface, (B) a sample chamber having a volume of 1 to 500 μL, inside the sample holder body, and (C) an inlet channel and an outlet channel, each fluidly connecting the sample chamber to the external surface of the sample holder body. The sample holder body has an isolation membrane, separating the sample chamber from the external surface, and the isolation membrane has a thickness of at most 500 μm. The differential scanning calorimetry sensor comprises (1) a substrate, (2) a heater trace comprising a conductive material, on the substrate, and (3) an encapsulation layer, on the substrate and on the heater trace. The heater trace has a thickness of 50 to 1000 nm, a width of 1 to 100 μm, and a path length of 5 to 500 mm.

In a fifth aspect, the invention is a method of preparing a thermogram of a liquid sample with a differential scanning calorimetry sensor, comprising scanning the liquid sample by increasing a current in the heater trace from an initial current to a final current in stepwise increments, where each increment is maintained for a dwell time; measuring the voltage applied during each dwell time; and preparing a thermogram based on the current and voltage of each increment.

Definitions

The resistance of the heater trace means the resistance at 25° C.

BRIEF DESCRIPTION OF THE DRAWINGS

The invention can be better understood with reference to the following drawings and description.

DETAILED DESCRIPTION

The present application describes a simplified point-of-care microelectromechanical system (MEMS) based thermal analysis sensor system, which can be used in the clinical setting to enhance diagnosis and monitoring of disease, particularly for hard to diagnose conditions such as lupus and Lyme disease. For example, while serological testing exists for Lyme disease, this testing is limited secondary to a high false negative rate (negative test result in patients that truly have Lyme disease). This can result in worsening of an untreated disease and prolonged, sometimes lifelong suffering. Preliminary data demonstrates that DSC testing may allow for earlier more accurate and more efficient diagnosis of Lyme disease—resulting in earlier treatment that may result in superior outcomes. The system includes a DSC sensor which includes a conductive trace which can act as both a heater and a temperature sensor. A sample holder, with a size and shape designed to be placed on the DSC sensor, and having a sample chamber, may be used to hold a sample during DSC analysis, for preparing a thermogram of the sample. A system enclosure which holds the DSC sensor, having an enclosure base and enclosure lid, may be used to isolate the DSC device and the sample holder while preparing the thermogram of the sample, and optionally includes one or more printed circuit boards for providing electrical connection to the DSC sensor. Optionally, the system may include a second DSC sensor device for the simultaneous measurement of a control sample.

The thermal analysis sensor system of the present application allows for expanded application for the analysis of biofluid samples with low protein concentrations, such as saliva, cerebrospinal fluid, and urine, in addition to plasma. This opens up the possibility for the development of new, DSC-based diagnostic tests based on biofluids other than plasma and serum. Additionally, it would allow for the application of DSC to new research areas for the analysis of biological samples, for example conditional media from cell culture or bacterial culture, where the protein concentration is not always high. Extension of the scanning temperature range of the sensor could also allow use in other industries outside of the clinical or research fields, such as food science, and the analysis of oils, liquid polymers, etc.

Figure 2:
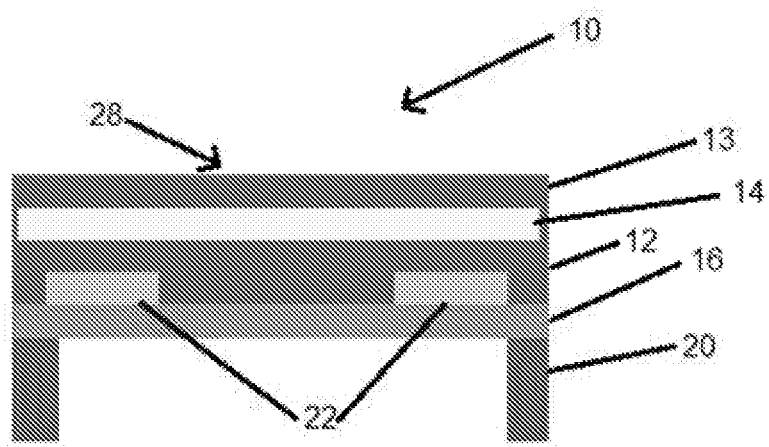
FIG. 2 is a schematic of a cross-section of a DSC sensor device.

FIG. 2 is a schematic of a DSC sensor device, 10, shown in cross-section. The DSC sensor includes an optional base, 20, a substrate, 16, on the base, a heater trace, 22, on the substrate, a first encapsulation layer, 12, on the substrate and the heater trace, an optional heat spreader, 14, on the heater trace, and an optional second encapsulation layer, 13, on the heat spreader. A sample heating area, 28, is also shown.

The substrate comprises an electrically insulating material, such as an oxide including silicon oxide. The base supports the substrate and may be formed of any material. Preferably, the base is silicon, and the substrate is a silicon oxide layer.

The heater trace may be formed of any conductive material, but preferably includes a highly conductive metal such as gold, silver, platinum or aluminum. Typically, an adhesion layer, such a chromium or titanium, is applied on the substrate, followed by application of the more conductive metal, to improve adhesion of the conductive metal to the substrate. The heater trace preferably has a thickness of 50 to 1000 nm, more preferably 300 to 600 nm, and preferably has a width 1 to 100 μm, more preferably 10 to 30 μm.

Figure 3:
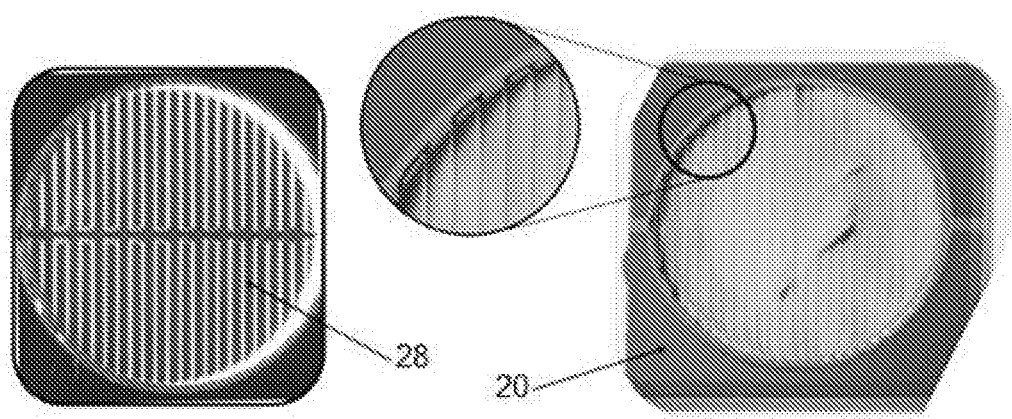
FIG. 3 shows images of a DSC sensor.

FIG. 3 shows images of a DSC sensor, with a first side on the left, and the opposite side on the right (showing the base, 20). A heater trace is visible in the image, forming a rectilinear path across the sample heating area, 28. The heater trace forms a path which travels along the surface of the substrate on which a sample will be heated (the sample heating area), to carry out DSC and obtain a thermogram. Typically, the sample heating area has the shape of a circle or square with an area of 3 to 625 mm$^2$, including 20, 30, 40, 50, 60, 70, 80, 90 and 100 mm$^2$. The diameter of the sample heating area (or length of a side of the sample heating area when in the shape of a square) may be 2 to 25 mm, including 3, 4, 5, 6, 6.5, 7, 7.2, 8, 9, 10, and 15 mm.

Figure 4:
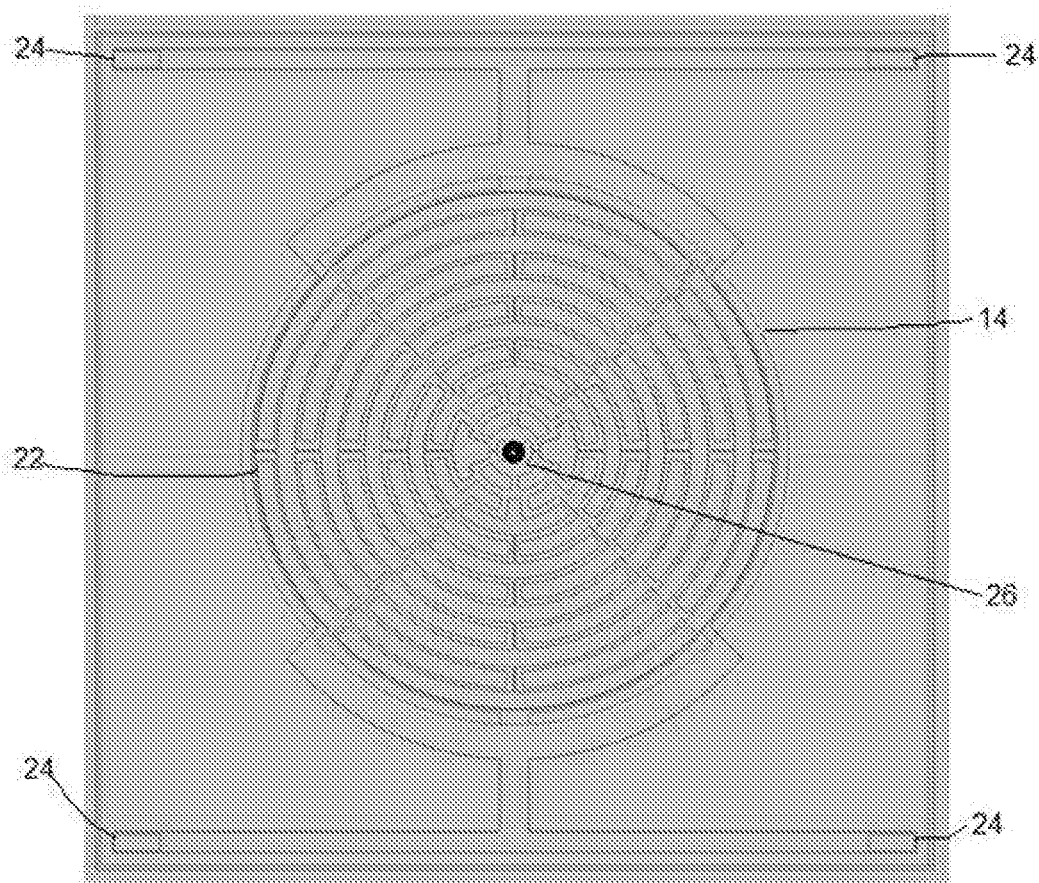
FIG. 4 shows the heater trace, in a different pattern than in FIG. 3.

FIG. 4 shows the heater trace, 22, in a different pattern than in FIG. 3. The ends of the heater trace will extend beyond the sample heating area to form electrical connections, 24, such as metal pads. Also shown in the figure is the outline of the heat spreader, 14, and an optional heat sensor, 26. Preferably, no separate heat sensor is included. The path length, thickness and width of the heater trace can each be adjusted to control the resistance. The path length may be, for example 5 to 500 mm, preferably 10 to 100 mm, including 45 mm. The resistance of the heater trace (measured at 25° C.) is preferably 10 to 1000 ohms, more preferably 50 to 500 ohms, including 80, 100, 150, 200 and 250 ohms.

The heater trace may be used as a temperature sensor. The DSC sensor may be thermally cycled in a temperature-controlled oven to remove any stress from fabrication, and at the same time the resistance of the heater trace may be recorded. The resistance of a metal heater trace will typically be linear, allowing tight control of temperature ramping. Ramping current or voltage (and thus indirectly ramping temperature) creates a controlled method of ramping the temperature of the sensor over a specified temperature range (such as 25 to 150° C.). The elimination of a separate temperature sensor keeps the DSC sensor more compact and simpler to manufacture. Optionally, a temperature sensor may be included in the DSC sensor, and may be made of a thin piece of metal (such as platinum) so that the temperature may be measured by monitoring resistance of the thin piece of metal (an RTD); alternatively, a thermocouple or thermopile could be used. Alternatively, the temperature of the sample may be measured after calibration using temperature standards, such as lipids. Calibration could also be carried out using optical methods to measure the temperature of the sensor.

The heat spreader helps ensure even distribution of the heat generated by the heater trace across a sample heating area. The heat spreader may be formed of any highly heat conductive material, preferably a metal such as gold or aluminum. Preferably, the heat spreader has a thickness of 30 to 1000 nm, more preferably 40 to 50 nm. The encapsulation layer (or layers) may be formed of any electrically insulating material, and is preferably a polymer, such as polyimide. Preferably, the polymer may be spin coated onto the heat trace and the substrate, and then an optional second layer spin coated on the heat spreader. The encapsulation layer (or layers) should be thick enough to protect the heat trace and the heat spreader from the environment, but thin enough to allow quick conduction of the heat from the heat trace. Preferably, the encapsulation layer or layers each have a thickness of 1 to 15 μm, more preferably 2 to 10 μm.

A DSC sensor was prepared as shown in FIG. 3; the width of the heater trace is 10 μm, formed of 520 nm thick platinum on 30 nm titanium (as an adhesion layer), encapsulated in 3 μm thick polyimide, covering a 7.2 mm diameter circular sample heating area, resulting in a heater trace having a resistance of 240 ohms. Using a Keithley 2450 SOURCEMETER™ to perform experiments using lysozyme as a plasma protein surrogate demonstrate that this configuration has adequate sensitivity to produce a thermogram signal for concentrations of lysozyme similar to those typically measured using commercial DSC instrumentation. Lipid standards may be used to calibrate the sensor for temperature by determining the current required to reach known lipid transition temperatures within the desired temperature range.

Figure 5:
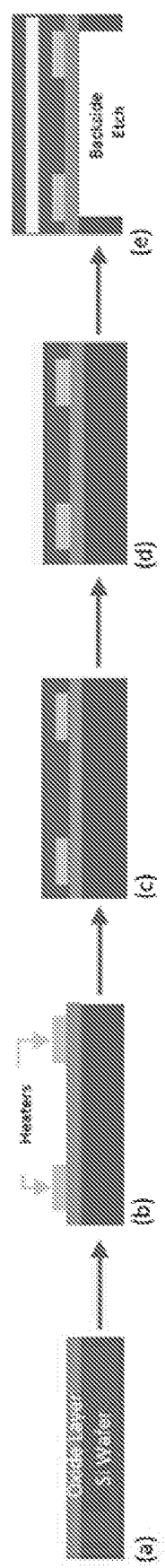
FIG. 5 is an illustration of a simplified fabrication process for a DSC sensor device.

A simplified overview of one possible fabrication process is shown in FIG. 5. In (a), a silicon wafer may be used as the base, with a native oxide layer on the top surface serving as the substrate. In (b), a heater trace may be patterned via sputtering (for example, gold on chromium (as the adhesion layer) electrical path, 300-400 nm thick, 10-20 μm wide, 45 mm long; approximate resistance of 250 ohms at 25° C.), on the top of the oxide layer. In (c), an encapsulation layer (for example, a polyimide layer) may be added via spin coating to passivate and enclose the heater trace. In (d), sputtering of a layer of metal (such as aluminum) to form a heat spreader. In (e), an optional second encapsulation layer may be formed to protect the heat spreader, followed by a backside reactive ion etching process using, for example $XeF_2$, may be used to isolate the substrate.

Figure 6:
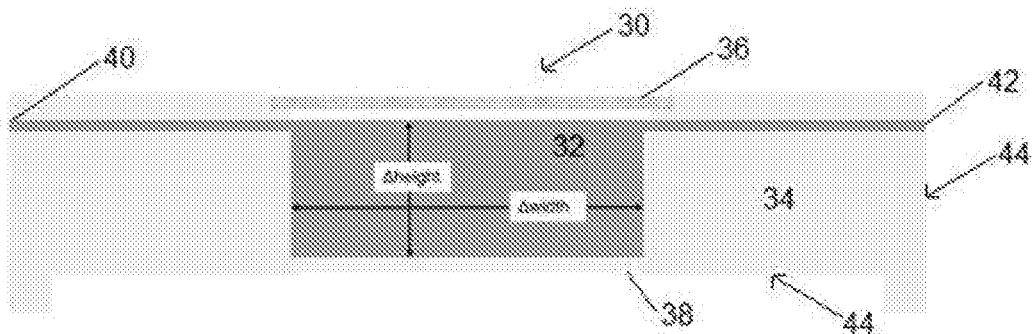
FIG. 6 illustrates a cross-section of a sample holder.
Figure 7:
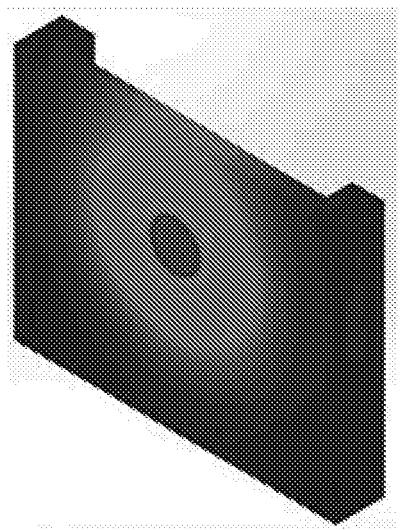
FIG. 7 illustrates a sample holder, with "wings".
Figure 8:
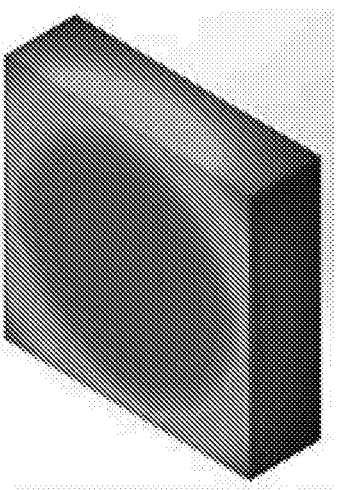
FIG. 8 illustrates an alternative design of a sample holder, without "wings".
Figure 9:
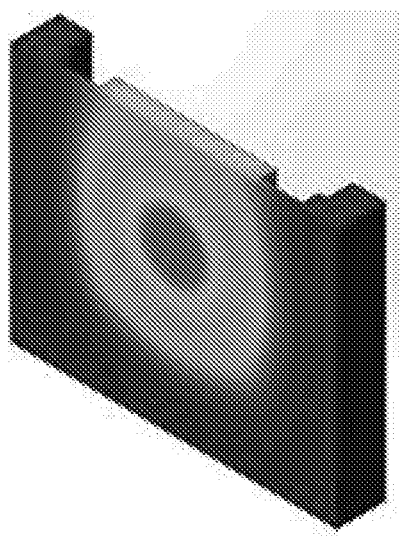
FIG. 9 illustrates still another alternative design of a sample holder, with "wings" and air pockets.

FIG. 6 illustrates a cross-section of a sample holder, 30. The sample holder includes a sample chamber, 32, and an inlet channel, 40, and an outlet channel, 42, each channel fluidly connecting the sample chamber with the external surface, 44, of the sample holder body. The sample chamber is defined by an isolation membrane, 38 (which separates the sample chamber from the external surface), the sample holder body, 34, which surrounds the sample chamber, and a sample chamber cap, 36. A plasma sample, diluted and ready for analysis, may be placed into the sample chamber using a syringe or pipette, through the inlet channel; alternatively, the sample holder may be formed with a tube attached to the inlet channel for filling the sample chamber. Preferably, the sample chamber has a volume of 1 to 500 μL, more preferably 2 to 50 μL, including 3, 4, 5, 6, 7, 8, 9, 10, 15, 20, 25, 30, 35, 40 and 45 μL. Preferably, the isolation membrane has a thickness of at most 500 pm, such as 100 to 500 μm, more preferably at most 300 μm, such as 150 to 300 μm, including 200 and 250 μm. Preferably, the height of the sample chamber is 0.25 to 4 mm, more preferably 0.5 to 2 mm. Preferably, the sample holder has a diameter not larger than the DSC sensor, and the shape and the width (diameter) of the sample chamber is sized to fit on to the sample heating area of the DSC sensor, for example 2 to 25 mm, including 3, 4, 5, 6, 6.5, 7, 7.2, 8, 9, 10, and 15 mm. The sample holder body and isolation membrane may be formed of any non-reactive biocompatible material, such as a polymer, including polydimethylsiloxane (PDMS). Similarly, the sample chamber cap may be formed of any solid material non-reactive with plasma, such as a polymer, including polydimethylsiloxane (PDMS), polymethyl methacrylate (PMMA), or glass. FIG. 7 illustrates a sample holder with a design similar to that shown in FIG. 6. FIG. 8 illustrates an alternative design of sample holder, without "wings"; the "wings" help the sample holder to conform to the surface of the DSC sensor. FIG. 9 illustrates still another alternative design of sample holder, with "wings" and air pockets to help isolate the sample chamber. In FIGS. 7, 8 and 9, each shade of gray shows isothermal regions from simulations of heating the sample holders on a DSC sensor. Soft lithography techniques or injection molding may be used to form the body of the sample holder, and a thin slab of cured PDMS or a glass coverslip may be attached to form the sample chamber cap (for example, via oxygen plasma treatment) to create the completed sample holder.

Figure 10:
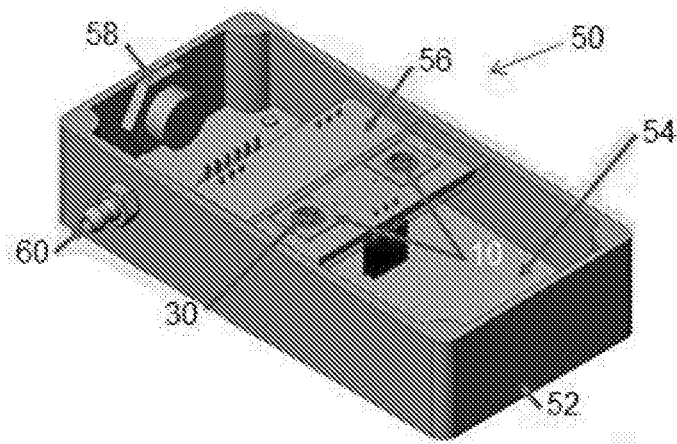
FIG. 10 illustrates a portion of a DSC sensor enclosure

FIG. 10 illustrates a portion of an optional sensor enclosure, 50, with the enclosure lid removed to show interior detail. Use of a sensor enclosure will aid to isolate the sensor from the external environment and provide convenient electrical connections to the DSC sensor. The sensor enclosure is shown with two DSC sensors, 10, but it may also be designed to hold only a single DSC sensor. On the DSC sensors are sample holders, 30, with one holding a sample, and the other holding, for example, a control (reference) sample. Such use of a second DSC sensor for a control sample would only be useful if the DSC sensors are selected or designed to be matched with the same resistance, size and design. Also illustrated is a first printed circuit board (PCB), 56, for providing electrical connections to the DSC sensors and holding the DSC sensors in place, and an optional second PCB, 54, for connecting the DSC sensors to external circuits such control hardware, via electrical connector, 58. Also illustrated is an enclosure base, 52, and an optional vacuum or pressurization port, 60, for evacuating or pressurizing the sensor enclosure.

Figure 11:
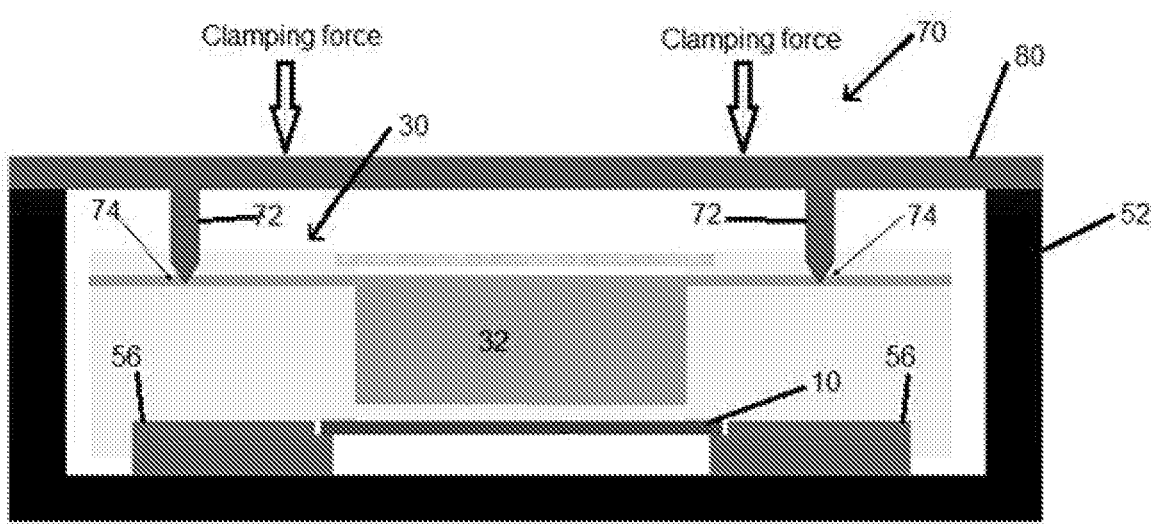
FIG. 11 Illustrates a cross-section of a thermal analysis sensor system.

FIG. 11 Illustrates a cross-section of thermal analysis sensor system, 70, sectioned through a sensor to show the placement of the DSC sensor, 10, on the first PCB, 56, the sample holder, 30 (including the sample chamber, 32), the sensor enclosure base, 52, and enclosure lid, 80. Also shown are enclosure lid clamps, 72, which pinch the sample holder inlet and outlet channels, at pinch points, 74, to prevent the sample from leaking out of the sample holder chamber if the interior of the sample enclosure is evacuated. Preferably, the sample holder is placed into contact with the substrate side of the DSC sensor, rather than the side closer to the heat spreader, because the heat spreader may become slightly concave during heating due to a mismatch in the coefficients of thermal expansion (CTE), breaking intimate contact between the DSC sensor and the sample holder; this flexing ensures intimate contact when the sample holder is placed into contact with the substrate side. Alternatively, the sample holder may be designed with a concave isolation membrane to allow for placement on the heat spreader side of the DSC sensor; or a thin glass layer could be added to balance out the CTE.

Figure 12:
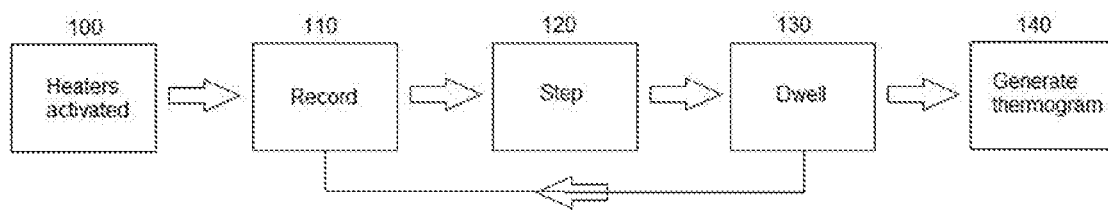
FIG. 12 is a flowchart illustrating the steps in a control program.

FIG. 12 is a flowchart illustrating the steps in a control program for obtaining a thermogram of a sample. Initially, a heating rate and scanning temperature range will be determined. Then, the DSC sensors ("heaters") are activated at 100 by passing current through the heater trace. Next, the current and voltage are recorded, or resistance of the heater trace is calculated to determine the temperature which is then recorded (or optionally, using a thermal sensor or resistance-temperature calibration curve generated using lipid temperature standards), at 110; if matched DSC sensors are used for a sample and a control, then the power applied to the heaters will be adjusted to ensure constant and consistent temperature between the two chambers. The temperature will then be increased, at 120, by increasing the current or voltage. Then, the increase will be maintained for a dwell time, at 130. Steps 110, 120, and 130, will be repeated until the temperature range has been scanned. Typically, data is recorded continuously during the scan. The power applied to the chamber for the given temperature along with the scanning rate is used to determine the differential heat capacity, either during the recording step 110, or from the recorded data at the end of the scanning. The differential heat capacity is then plotted against the temperature to obtain a thermogram, at 140.

Figure 13:
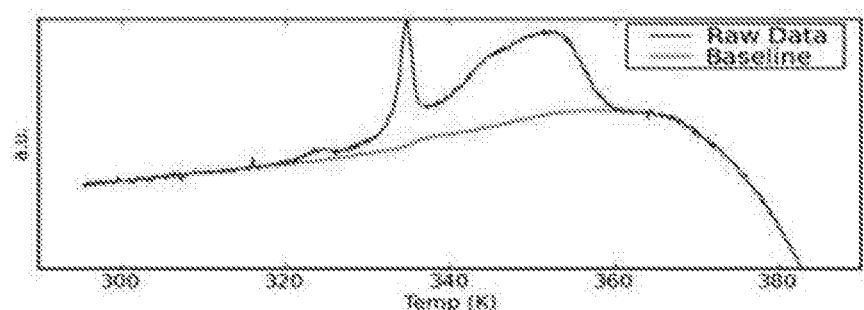
FIG. 13 is a graph showing an example of raw data and baseline data.
Figure 14:
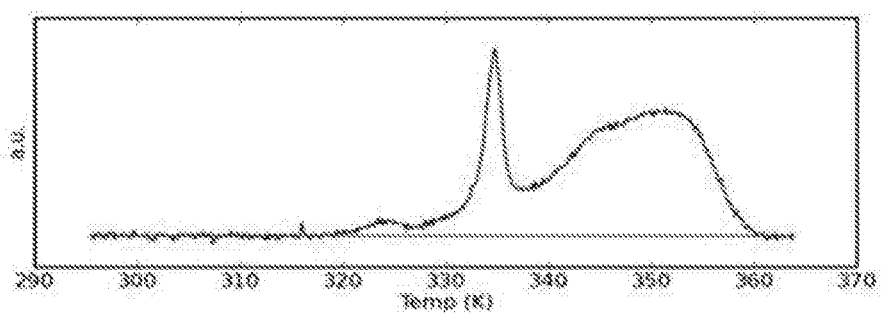
FIG. 14 is a graph showing the resulting data after baseline subtraction.

Several different protocols for preparing thermograms of samples are possible. A "blank" data sample may be obtained using a temperature scan of buffer solution with no sample. Next, a scan is performed, using the same parameters for the buffer solution with a certain concentration of sample material added (for example, 1 mg/mL). When the DSC sensor uses the heater trace to also measure temperature, the data may be obtained as current versus power, which may be converted to temperature versus power using the resistance of the heater trace at different temperatures within the scanning temperature range, or based on a temperature calibration curve obtained using standards (such as lipid standards). These two data sets are subtracted, resulting in a differential signal of current versus power, which may be converted to temperature versus power using the known resistance of the heater trace at different temperatures within the scanning temperature range. Alternatively, the conversion to temperature versus power may be carried out first, then the two data sets subtracted; or the power signal may be converted to excess specific heat capacity. In a further variation, ramping voltage, in steps with a dwell time for each step, can be used instead of ramping current. Alternatively, a "blank" buffer and sample could be run in parallel using a pair of matched DSC sensors, either housed together in a single sensor enclosure, or 2 separate DSC sensors. After subtraction of the "blank" data sample, normalization for total protein concentration is performed followed by correction for the sample baseline. Heat capacity is an extensive property, that is, it is proportional to the mass of the substance, thus, normalizing for total protein content allows the direct comparison of plasma samples with different total protein concentrations. Normalization using total protein is one possible method for data normalization. Other possible methods include normalization using the height of a selected peak in the thermogram [10, 18]. During the thermal transition the sample comprises a mixture of folded and unfolded forms of all components, each with different heat capacities. The sample baseline must be selected to estimate the heat capacity of the sample at any temperature during the thermal transition. Various sample baseline correction methods can be used [38], such as, linear baseline, cubic baseline, progress (sigmoidal) baseline, step baseline, spline interpolation, to estimate the sample baseline between the pre- and post-transition regions of the thermogram. FIG. 13 illustrates one example of the sample baseline applied to raw DSC data after subtraction of the "blank" data sample. Subtraction of the sample baseline from these raw data produces the desired final thermogram data for the sample (shown in FIG. 14). Once a thermogram of a plasma sample from a patient is obtain, a visual output may be produced based on the thermogram, and optionally based on reference thermograms, such as printed a graph of the thermogram on paper or displayed on a monitor, or a comparison of the thermogram with reference thermograms, or even the results of a comparison of the patient thermogram with reference thermograms indicating which different cancer or disease most closely with the patient thermogram.

Factors that can be altered to change the scans include the scanning rate, step size (either based on current, temperature or voltage), dwell time per step, and sample concentration. Physical dimensions of the sample holder, such as isolation membrane thickness and the dimension of the sample chamber, can also change the scans. Exemplary scan rates include 0.1° C./minute to 50° C./minute, including 0.5° C./minute to 10° C./minute. Exemplary step sizes include 0.1 pA to 10 mA, including 1 pA to 1 mA. Exemplary dwell times per step includes 0.1 seconds to 60 seconds, including 0.5 seconds to 10 seconds. Typically, plasma is diluted 25-fold (~2 mg/mL protein concentration) for analysis, but higher concentrations of protein, for example 10-fold dilution or 5-fold dilution, may be used to enhance the signal. Lower concentrations could also be used. For a scanning temperature range of about 25° C. to 100° C., example scans include: (1) scanning 0.1 to 48 mA over 48 minutes using a step size of 0.1 mA with 6 second dwell time; (2) scanning 0.1 to 40 mA over 40 minutes using a step size of 0.1 mA with 6 second dwell time; (3) scanning 0.05 to 40 mA over 40 minutes using a step size of 0.05 mA with 3 second dwell time; and (4) scanning 0.1 to 40 mA over 20 minutes using a step size of 0.1 mA with 3 second dwell time.

Figure 1:
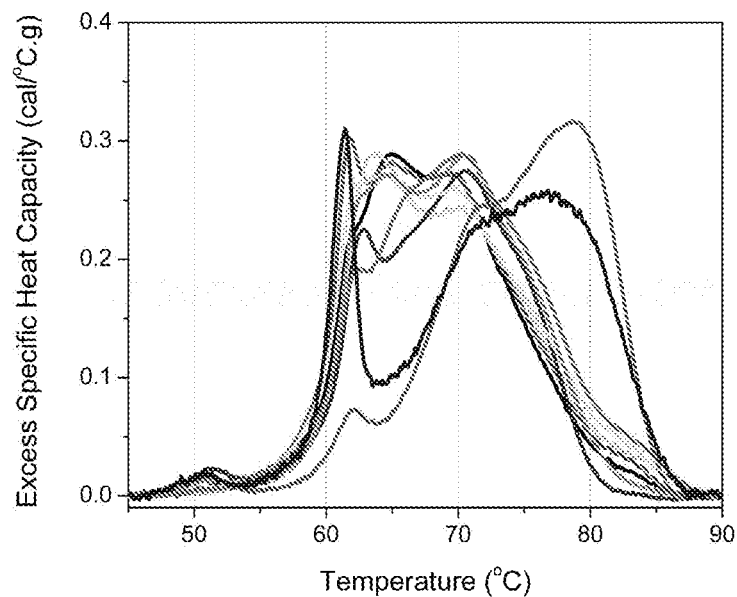
FIG. 1 is a graph showing mean thermograms for blood plasma samples obtained from individuals diagnosed with various cancers and diseases.

Details of patients from whom samples may be obtained, processing of whole blood samples to obtain plasma for testing, the dilution and other preparation of plasma for testing, and the interpretation of thermograms, may be found in patent application publications, including PCT publication nos. WO 2008/089072, WO 2010/033606, WO 2011/156658, and WO 2017/066800 [27-30, 39]. Preliminary data supports the use of thermograms to characterize diseases including differences in thermograms for various disease states. FIG. 1 displays example data showing differences in mean thermograms for blood plasma samples obtained from individuals diagnosed with various cancers and diseases. Different shades of gray represent a different cancer or disease: endometrial cancer (mean thermogram from 8 patients [N=8]); amyotrophic lateral sclerosis (N=12); lung cancer (N=30); ovarian cancer (N=12); Lyme disease (N=4); systemic lupus erythematosus (N=2); rheumatoid arthritis (N=5); and melanoma (N=5) [18].

REFERENCES

1. Garbett N C, Mekmaysy C S, Helm C W, Jenson A B and Chaires J B. Differential scanning calorimetry of blood plasma for clinical diagnosis and monitoring. Experimental and molecular pathology. 2009; 86:186-91.
2. Garbett N C, Miller J J, Jenson A B and Chaires J B. calorimetry outside the box: a new window into the plasma proteome. Biophysical journal. 2008; 94:1377-83.
3. Garbett N C, Miller J J, Jenson A B and Chaires J B. calorimetric analysis of the plasma proteome. Seminars in nephrology. 2007; 27:621-6.
4. Garbett N C, Miller J J, Jenson A B, Miller D M and Chaires J B. Interrogation of the plasma proteome with differential scanning calorimetry. Clinical chemistry. 2007; 53:2012-4.
5. Garbett N C, Miller J J, Jenson A B and Chaires J B. Ligand Binding Alters the calorimetric Thermogram of Albumin. J Clin Ligand Assay. 2006; 29:194-197.
6. Garbett N C, Merchant M L, Chaires J B and Klein J B. calorimetric analysis of the plasma proteome: identification of type 1 diabetes patients with early renal function decline. Biochimica et biophysica acta. 2013; 1830:4675-80.
7. Garbett N C, Merchant M L, Helm C W, Jenson A B, Klein J B and Chaires J B. Detection of cervical cancer biomarker patterns in blood plasma and urine by differential scanning calorimetry and mass spectrometry. PloS one. 2014; 9:e84710.
8. Garbett N C, Brock G N, Chaires J B, Mekmaysy C S, DeLeeuw L, Sivils K L, Harley J B, Rovin B H, Kulasekera K B and Jarjour W N. Characterization and classification of lupus patients based on plasma thermograms. PloS one. 2017; 12:e0186398.
9. Kendrick S K, Zheng Q, Garbett N C and Brock G N. Application and interpretation of functional data analysis techniques to differential scanning calorimetry data from lupus patients. PloS one. 2017; 12:e0186232.
10. Velazquez-Campoy A, Vega S, Sanchez-Gracia O, Lanas A, Rodrigo A, Kaliappan A, Hall M B, Nguyen T Q, Brock G N, Chesney J A, Garbett N C and Abian O. Thermal liquid biopsy for monitoring melanoma patients under surveillance during treatment: A pilot study. Biochimica et biophysica acta General subjects. 2018; 1862:1701-1710.
11. Fekecs T, Zapf I, Ferencz A and Lorinczy D. Differential scanning calorimetry (DSC) analysis of human plasma in melanoma patients with or without regional lymph node metastases. J Therm Anal calorim. 2012; 108:149-152.
12. Michnik A, Drzazga Z, Michalik K, Barczyk A, Santura I, Sozańska E and Pierzchafa W. Differential scanning calorimetry study of blood serum in chronic obstructive pulmonary disease. J Therm Anal calorim. 2010; 102:57-60.
13. Todinova S, Krumova S, Gartcheva L, Robeerst C and Taneva S G. Microcalorimetry of blood serum proteome: a modified interaction network in the multiple myeloma case. Analytical chemistry. 2011; 83:7992-8.
14. Todinova S, Krumova S, Kurtev P, Dimitrov V, Djongov L, Dudunkov Z and Taneva S G. calorimetry-based profiling of blood plasma from colorectal cancer patients. Biochimica et biophysica acta. 2012; 1820:1879-85.
15. Zapf I, Fekecs T, Ferencz A, Tizedes G, Paviovics G, Kalman E and Lörinczy D. DSC analysis of human plasma in breast cancer patients. Thermochim Acta. 2011;524:88-91.
16. Chagovetz A A, Jensen R L, Recht L, Glantz M and Chagovetz A M. Preliminary use of differential scanning calorimetry of cerebrospinal fluid for the diagnosis of glioblastoma multiforme. Journal of neuro-oncology. 2011; 105:499-506.
17. Chagovetz A A, Quinn C, Damarse N, Hansen L D, Chagovetz A M and Jensen R L. Differential scanning calorimetry of gliomas: a new tool in brain cancer diagnostics? Neurosurgery. 2013; 73:289-95; discussion 295.
18. Vega S, Garcia-Gonzalez M A, Lanas A, Velazquez-Campoy A and Abian O. Deconvolution analysis for classifying gastric adenocarcinoma patients based on differential scanning calorimetry serum thermograms. Scientific reports. 2015; 5:7988.
19. Krumova S, Todinova S, Mavrov D, Marinov P, Atanassova V, Atanassov K and Taneva S G. Intercriteria analysis of calorimetric data of blood serum proteome. Biochimica et biophysica acta General subjects. 2017; 1861:409-417.
20. Todinova S, Krumova S, Danailova A, Petkova V, Guenova M, Mihaylov G, Gartcheva L and Taneva S G. calorimetric markers for monitoring of multiple myeloma and Waldenstrom's macroglobulinemia patients. European biophysics journal: EBJ. 2018; 47:549-559.
21. Todinova S, Krumova S, Radoeva R, Gartcheva L and Taneva S G. calorimetric markers of Bence Jones and nonsecretory multiple myeloma serum proteome. Analytical chemistry. 2014; 86:12355-61.
22. Fish, D. J. et al., "Statistical analysis of plasma thermograms measured by differential scanning calorimetry", Biophysical Chemistry, vol. 152, no. 1-3, pp. 184-190 (2010).
23. Rai, S. N. et al., "Group classification based on high-dimensional data: application to differential scanning calorimetry plasma thermogram analysis of cervical cancer and control samples", Open Access Medical Statistics, vol. 3, pp. 1-9 (2013).
24. Garbett, N. C. et al., "Differential scanning calorimetry as a complementary diagnostic tool for the evaluation of biological samples", Biochimica et Biophysica Acta, vol. 1860, no. 5, pp. 981-989 (2016).
25. Garbett, N. C. et al., "Clinical application of plasma thermograms. Utility, practical approaches and considerations", Methods, vol. 76, pp. 41-50 (2014).
26. Wisniewski, M. et al., "Differential scanning calorimetry in molecular diagnostics", In Vitro Diagnostic Technology, vol. 17, no. 6, pp. 29-34 (2011).
27. WO 2008/089072.
28. WO 2010/033606.
29. WO 2011/156658.
30. WO 2017/066800.
31. Wang, L. et al., "Demonstration of MEMS-based differential scanning calorimetry for determining thermodynamic properties of biomolecules", Sensors and Actuators B: Chemical, vol. 134, pp. 953-958 (2008).
32. Yu, S. et al., "Review of MEMS differential scanning calorimetry for biomolecular study", Frontiers of Mechanical Engineering, vol. 12, no. 4, pp. 526-538 (2017).
33. Jia, Y. etal., "A polymer-based MEMS differential scanning calorimeter", Sensors and Actuators A: Physical, vol. 231, pp. 1-7 (2015).
34. Wang, B. et al., "MEMS-based AC differential scanning calorimetry", 2011 16th International Solid-State Sensors, Actuators and Microsystems Conference, pp. 1958-1961 (2011).
35. Wang, B. et al., "A MEMS differential scanning calorimeter for thermodynamic characterization of biomolecules", 2011 IEEE 24th International Conference on Micro Electro Mechanical Systems, pp. 821-824 (2011).
36. Wang, B. et al., "A MEMS differential-scanning-calorimetric sensor for thermodynamic characterization of biomolecules", Journal of Microelectromechanical Systems, vol. 21, no. 5, pp. 1165-1171 (2012).
37. Wang, L. et al., "A MEMS thermal biosensor for metabolic monitoring applications", Journal of Microelectromechanical Systems, vol. 17, no. 2, pp. 318-327 (2008).
38. Cooper A, Nutley M and Wadood A. Differential scanning microcalorimetry. In: B. Chowdhry and S. Harding, eds. *Protein-Ligand Interactions: hydrodynamics and calorimetry: a practical approach* Oxford, UK: Oxford University Press; 2001: 287-318.
39. WO 2012/109383.

What is claimed is:
1. A differential scanning calorimetry sensor, comprising:
a substrate, a heater trace comprising a conductive material, on the substrate, and an encapsulation layer, on the substrate and on the heater trace, wherein the heater trace has a thickness of 50 to 1000 nm, a width of 1 to 100 µm, and a path length of 5 to 500 mm, and the differential scanning calorimetry sensor does not include a separate temperature sensor, and the heater trace is configured to function to both heat a sample and measure the temperature of the sample.

2. The differential scanning calorimetry sensor of claim 1, further comprising a heat spreader on the heater trace, wherein the substrate comprises an oxide, the heater trace comprises the conductive material on an adhesion layer, the conductive material is a metal, the encapsulation layer comprises a polymer, and the heater trace has a thickness of 300 to 600 nm, a width of 10 to 30 µm, and a path length of 10 to 100 mm.

3. The differential scanning calorimetry sensor of claim 2, wherein the resistance of the heater trace is 10 to 1000 ohms.

4. The differential scanning calorimetry sensor of claim 2, wherein the encapsulation layer has a thickness of 1 to 15 µm.

5. The differential scanning calorimetry sensor of claim 2:

further comprising a base comprising silicon, and wherein the substrate comprises silicon oxide.

6. The differential scanning calorimetry sensor of claim 5, wherein:

the conductive material comprises gold, the adhesion layer comprises chromium, the heat spreader comprising aluminum, and the resistance of the heater trace is 50 to 500 ohms.

7. The differential scanning calorimetry sensor of claim 5, wherein:

the conductive material comprises platinum, the adhesion layer comprises titanium, the heat spreader comprising aluminum, and the resistance of the heater trace is 50 to 500 ohms.

8. A sensor enclosure, comprising:

an enclosure base, a first printed circuit board on the enclosure base, the differential scanning calorimetry sensor of claim 1, on and electrically connected to the first printed circuit board, and an electrical connector electrically connected to the first printed circuit board, passing through the enclosure base.

9. The sensor enclosure of claim 8, further comprising a second printed circuit board, electrically connecting the first printed circuit board to the electrical connector.

10. The sensor enclosure of claim 9, further comprising:

a port for evacuating or pressurizing the sensor enclosure, an enclosure lid, wherein the enclosure lid comprises enclosure lid clamps.

11. The sensor enclosure of claim 8, further comprising a port for evacuating or pressurizing the sensor enclosure.

12. The sensor enclosure of claim 8, further comprising an enclosure lid.

13. A method of preparing a thermogram of a liquid sample with the differential scanning calorimetry sensor of claim 1, comprising:

scanning the liquid sample by increasing a current in the heater trace from an initial current to a final current in stepwise increments, wherein each increment is maintained for a dwell time;

measuring the voltage applied during each dwell time; and preparing a thermogram based on the current and voltage of each increment.

14. The method of claim 13, wherein the liquid sample is in a sample chamber of a sample holder, the sample holder comprising:

a sample holder body having an external surface, the sample chamber having a volume of 1 to 500 µL, inside the sample holder body, and an inlet channel and an outlet channel, each fluidly connecting the sample chamber to the external surface of the sample holder body, wherein the sample holder body has an isolation membrane, separating the sample chamber from the external surface, and the isolation membrane has a thickness of at most 500 µm.

15. The method of claim 13, wherein:

the liquid sample comprises plasma, and during the scanning, the temperature of the liquid sample ranges from 25° C. to 100° C.

16. A thermal analysis sensor system, comprising:

(a) a sensor enclosure, comprising:
  (i) an enclosure base,
  (ii) a first printed circuit board on the enclosure base,
  (iii) a differential scanning calorimetry sensor, on and electrically connected to the first printed circuit board, and
  (iv) an electrical connector electrically connected to the first printed circuit board, passing through the enclosure base, and (b) a sample holder, on the differential scanning calorimetry sensor, comprising:
  (A) a sample holder body having an external surface,
  (B) a sample chamber having a volume of 1 to 500 µL, inside the sample holder body, and
  (C) an inlet channel and an outlet channel, each fluidly connecting the sample chamber to the external surface of the sample holder body, wherein the sample holder body has an isolation membrane, separating the sample chamber from the external surface, and the isolation membrane has a thickness of at most 500 µm, the differential scanning calorimetry sensor comprises:
  (1) a substrate,
  (2) a heater trace comprising a conductive material, on the substrate, and
  (3) an encapsulation layer, on the substrate and on the heater trace, wherein the heater trace has a thickness of 50 to 1000 nm, a width of 1 to 100 µm, and a path length of 5 to 500 mm, and the differential scanning calorimetry sensor does not include a separate temperature sensor, and the heater trace is configured to both heat a sample in the sample chamber and measure the temperature of the sample in the sample chamber.

17. The thermal analysis sensor system of claim 16, wherein:

the sensor enclosure further comprises:
  (iv) a second printed circuit board, electrically connecting the first printed circuit board to the electrical connector,
  (v) a port for evacuating or pressurizing the sensor enclosure,
  (vi) an enclosure lid, wherein the enclosure lid comprises enclosure lid clamps, the differential scanning calorimetry sensor further comprising (4) a heat spreader on the heater trace,
the sample chamber has a volume of 2 to 50 µL,
the isolation membrane has a thickness of at most 300 µm,
the sample holder body comprises polydimethylsiloxane,
the substrate comprises an oxide,
the heater trace comprises the conductive material on an adhesion layer,
the conductive material is a metal,
the encapsulation layer comprises a polymer, and
the heater trace has a thickness of 300 to 600 nm, a width of 10 to 30 µm, and a path length of 10 to 100 mm.

18. A method of preparing a thermogram of a liquid sample with the thermal analysis sensor system of claim 16, comprising:
scanning the liquid sample by increasing a current in the heater trace from an initial current to a final current in stepwise increments, wherein each increment is maintained for a dwell time;
measuring the voltage applied during each dwell time; and
preparing a thermogram based on the current and voltage of each increment.

\* \* \* \* \*